(12) United States Patent
Aoki

(10) Patent No.: US 7,394,399 B2
(45) Date of Patent: Jul. 1, 2008

(54) POINTER TYPE INDICATING APPARATUS

(75) Inventor: Takashi Aoki, Gifu (JP)

(73) Assignee: Denso Corporation, Kariya (JP)

( * ) Notice: Subject to any disclaimer, the term of this patent is extended or adjusted under 35 U.S.C. 154(b) by 202 days.

(21) Appl. No.: 11/301,081

(22) Filed: Dec. 12, 2005

(65) Prior Publication Data

US 2006/0145888 A1 Jul. 6, 2006

(30) Foreign Application Priority Data

Dec. 16, 2004 (JP) ............................. 2004-364758

(51) Int. Cl.
*G08B 5/24* (2006.01)
(52) U.S. Cl. ...................... 340/815.78; 340/815.58; 340/461
(58) Field of Classification Search ................ 340/438, 340/439, 441, 461, 815.4, 815.58, 815.78; 200/11 A, 11 B, 308, 336; 74/527, 553; 454/69
See application file for complete search history.

(56) References Cited

U.S. PATENT DOCUMENTS

| | | | |
|---|---|---|---|
| 5,365,292 A | | 11/1994 | Wakabayashi et al. |
| 5,700,191 A | * | 12/1997 | Nieling et al. ................ 454/69 |
| 5,819,597 A | * | 10/1998 | Sato et al. ...................... 74/553 |
| 6,593,667 B1 | * | 7/2003 | Onodera et al. ............ 307/10.1 |
| 6,636,197 B1 | * | 10/2003 | Goldenberg et al. ........ 345/156 |
| 7,163,455 B2 | * | 1/2007 | Ogawa et al. ................. 454/69 |

FOREIGN PATENT DOCUMENTS

JP 2002-071389 3/2002

* cited by examiner

*Primary Examiner*—Van T. Trieu
(74) *Attorney, Agent, or Firm*—Harness, Dickey & Pierce, PLC

(57) ABSTRACT

A pointer type indicating apparatus includes dial plates each of which has an index portion for indicating operation information items of an operation object, pointers each of which is driven to point one of the operation information items, driving units for driving the pointers, and operation units, each of which is adjustable by an user to actuate the driving unit so that the pointer points preferable one of the operation information items. The operation unit has a substantial cylinder shape and is rotatable. The dial plate, the index portion and the pointer are arranged at the inner side of the operation unit. Thus, the appearance of the pointer type indicating apparatus can be simplified, and the user can be provided with an intuitionistic operation.

20 Claims, 13 Drawing Sheets

POINTER TYPE INDICATING APPARATUS

CROSS REFERENCE TO RELATED APPLICATION

This application is based on a Japanese Patent Application No. 2004-364758 filed on Dec. 16, 2004, the disclosure of which is incorporated herein by reference.

FIELD OF THE INVENTION

The present invention relates to a pointer type indicating apparatus.

BACKGROUND OF THE INVENTION

Referring to JP-2002-71389A, a general pointer type indicating apparatus is suitably used for an operation panel P1 of a vehicle air conditioner, as shown in FIGS. 16A and 16B.

The pointer type indicating apparatus has multiple indicators M11, M12 and M13 and multiple operation switches SW1, SW2 and SW3. The indicators M11, M12 and M13 indicate operation content of the vehicle air conditioner, which includes the blowing-out mode, the blowing fan speed, and the temperature, for example.

FIG. 16B is an enlarged view of the indicator M11 in FIG. 16A. The indicator M11, being constructed of an analog meter, has a dial plate 1 on which illustrations 2 (i.e., index portion) are provided to indicate the various blowing-out modes (i.e., operation information items), and a pointer 3 which points one of the illustrations 2. The indicator M12, M13 has the same construction with the indicator M11. The pointer 3 of the indicator M12, M13 points one of the operation information items indicated by the index portion 2 (letters or illustrations) shown on the dial plate 1 thereof.

The operation switches SW1, SW2 and SW3, each of which is constructed of a seesaw switch, are respectively arranged at the lower side of the indicators M11, M12 and M13. A user presses the operation switch SW1, SW2, SW3 so that the corresponding pointer 3 points the preferable letter or illustration 2. Thus, the blowing-out mode, the blowing fan speed and the temperature can be adjusted. Then, the vehicle air conditioner is controlled to provide a preferable operation.

The pointer type indicating apparatus is further provided with an operation button B0 for setting the vehicle air conditioner (A/C), an operation button B1 for setting an automatic air-blowing operation, an operation button B2 for a defogger and an operation button B3 for setting an air circulation mode.

However, in this case, the operation panel P1 (air conditioner panel) is provided with a lot of operation units including the operation switches SW1-SW3 and the operation buttons B0-B3, thus having a complicated appearance. Therefore, it is intricate for the user to seek for the wanted switch and button. Thus, an operation confusion will be caused.

Moreover, the indicator M11, M12, M13 is arranged separately from the operation switch SW1, SW2, SW3 on the air conditioner panel P1. Therefore, the user is to discriminate the indicator M11, M12, M13 and the corresponding operation switch SW1, SW2, SW3 to operate them.

For example, in the case where the user wants to adjust the blowing-out mode, the user is to visually identify the indicator M11 to confirm the current blowing-out mode, and discriminate the operation switch SW1 (for setting blowing-out mode) from the operation switches SW2 and SW3 by the index portion 2 (illustrations or letters) shown thereon. Thus, bewilderment in operation will be caused.

This problem also occurs when the pointer type indicating apparatus is used for an operation panel of an audio, a camera or the like.

SUMMARY OF THE INVENTION

In view of the above-described disadvantages, it is an object of the present invention to provide a pointer type indicating apparatus having an improved operation performance, so that operation confusion can be restricted.

According to the present invention, a pointer type indicating apparatus is provided with at least one dial plate which has at least one index portion for indicating multiple operation information items of an operation object, at least one pointer which is driven to point one of the operation information items indicated by the index portion, at least one driving unit for driving the pointer, and at least one operation unit, which is adjustable by an user to actuate the driving unit so that the pointer points preferable one of the operation information items for the sake of an operation of the operation object. The operation unit is rotatable and has a substantial cylinder shape. The dial plate, the index portion and the pointer are arranged at an inner side of the operation unit.

Because the dial plate and the pointer (which construct indicator) are arranged inside the operation unit, the appearance of the pointer type indication apparatus can be simplified, as compared with the case where the dial plate and the pointer are arranged at the outer side of the operation unit to be separated from it. Thus, the user can readily discriminate the operation unit. Therefore, confusion in operation can be restricted so that the pointer type indicating apparatus has an improved operation performance.

The operation unit is constructed to have a ring shape when being viewed from the exterior. That is, the operation unit can be provided with an opening at the inner side of the face surface thereof, or provided with a transparent construction at the inner side of the face surface to have a ring-shaped contour at the inner side thereof.

Preferably, the single pointer and the single dial plate having the single index portion are arranged at the inner side of the single operation unit. Alternatively, the multiple operation units can be concentrically arranged, and the multiple dial plates and the pointers can be arranged at the inner side of the operation unit.

Because the indicator is arranged at the same position on the operation panel with the operation unit, the user can directly operate the indicator indicating the operation information which the user wants to adjust. Thus, the user is provided with an intuitionistic operation. Accordingly, confusion in operation can be restricted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

A pointer type indicating apparatus according to a first embodiment of the present invention will be described with reference to FIGS. 1-8. In this case, the pointer type indicating apparatus is suitably used for an air conditioner panel of a vehicle, for example. That is, an air conditioner of the vehicle is an operation object.

Figure 1:
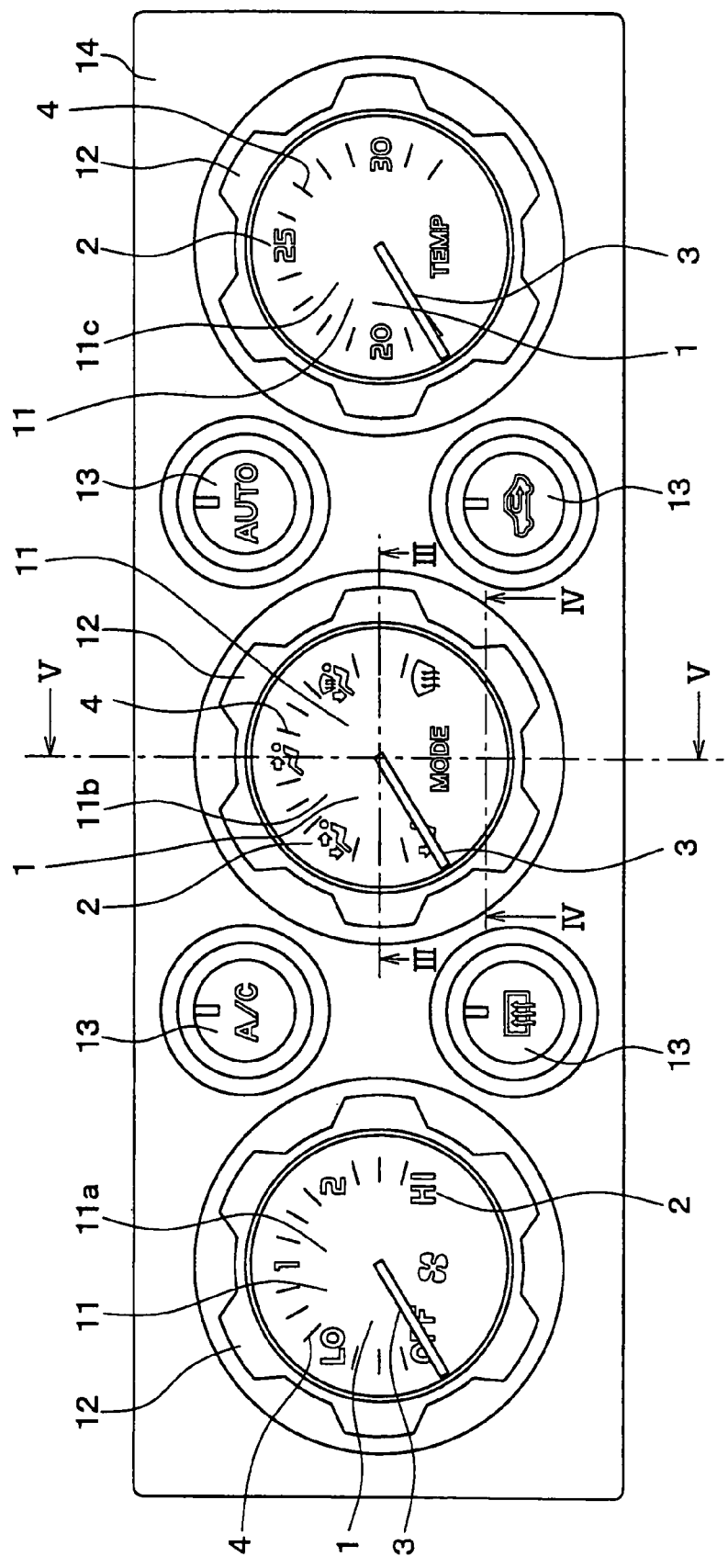
FIG. 1 is a front view showing a pointer type indicating apparatus according to a first embodiment of the present invention.

Multiple sets (e.g., three sets which are independent of each other) of indicators 11 and bezels 12 are provided for the pointer type indicating apparatus. Referring to FIG. 1, the pointer type indicating apparatus has the three indicators 11 (i.e., indicator 11a at light side, indicator 11b at middle and indicator 11c at right side) and the three bezel dial knobs 12 (operation units), multiple (e.g., four) operation buttons 13 and a cover 14.

Each of the bezel dial knobs 12 has a substantial cylinder shape. In this embodiment, referring to FIG. 3, a smoke lens 21 is arranged at the inner side of a face surface of the cylinder-shaped bezel dial knob 12 (bezel 12). The smoke lens 21 is transparent so that it seems that the bezel 12 has an opening at the inner side when being viewed from the exterior.

The indicators 11 are respectively disposed at the inner sides of the bezels 12, and positioned at the back side of the smoke lens 21 when being viewed from the exterior. The bezel 12 is arranged at the periphery of the indicator 11.

Each of the indicators 11 shows multiple operation information items related to the vehicle air conditioner. The indicator 11 includes a dial plate 1 and a pointer 3. The dial plate 1 is provided with an index portion for indicating the operation information items of the operation object. The index portion includes notations 2 (e.g., letters, numbers and illustrations) and/or calibration markings 4 (i.e., graduations), which are shown on the dial plate 1 and arranged along a substantial arc (e.g., round arc and ellipse arc) or the like thereon.

Specifically, the indicator 11a at the light side in FIG. 1 indicates the information related to the velocity of a blowing fan of the vehicle air conditioner. The calibration markings 4 and the notations 2 (e.g., letters) such as "OFF", "LO", "1", "2" and "HI" are shown on the dial plate 1 of the indicator 11a.

The indicator 11b at the middle in FIG. 1 shows the information related to the blowing-out modes of the vehicle air conditioner. The calibration markings 4 and the notations 2 (e.g., illustrations) indicating a foot blowing-out mode, a bi-level blowing-out mode, a head blowing-out mode, a foot/defogger blowing-out mode, a defogger blowing-out mode and the like are shown on the dial plate 1 of the indicator 11b.

The indicator 11c at the right side in FIG. 1 shows the temperature information. The calibration markings 4 and the notations 2 (e.g., numbers) are shown on the dial plate 1 of the indicator 11c.

The bezel 12, being a part of a dial switch, is rotatable along the outer side thereof with respect to the central axis of the bezel 12 having the substantial cylinder shape. The rotation of the bezel 12 is independent of the dial plate 1. The bezel 12 is adjustable by a user so that the pointer 3 points the preferable one of the notations 2 (or calibration markings 4) for a control of the vehicle air conditioner. That is, the pointer 3 can be adjusted to point the preferable one of the operation information items indicated by the index portion of the dial plate 1.

Figure 2:
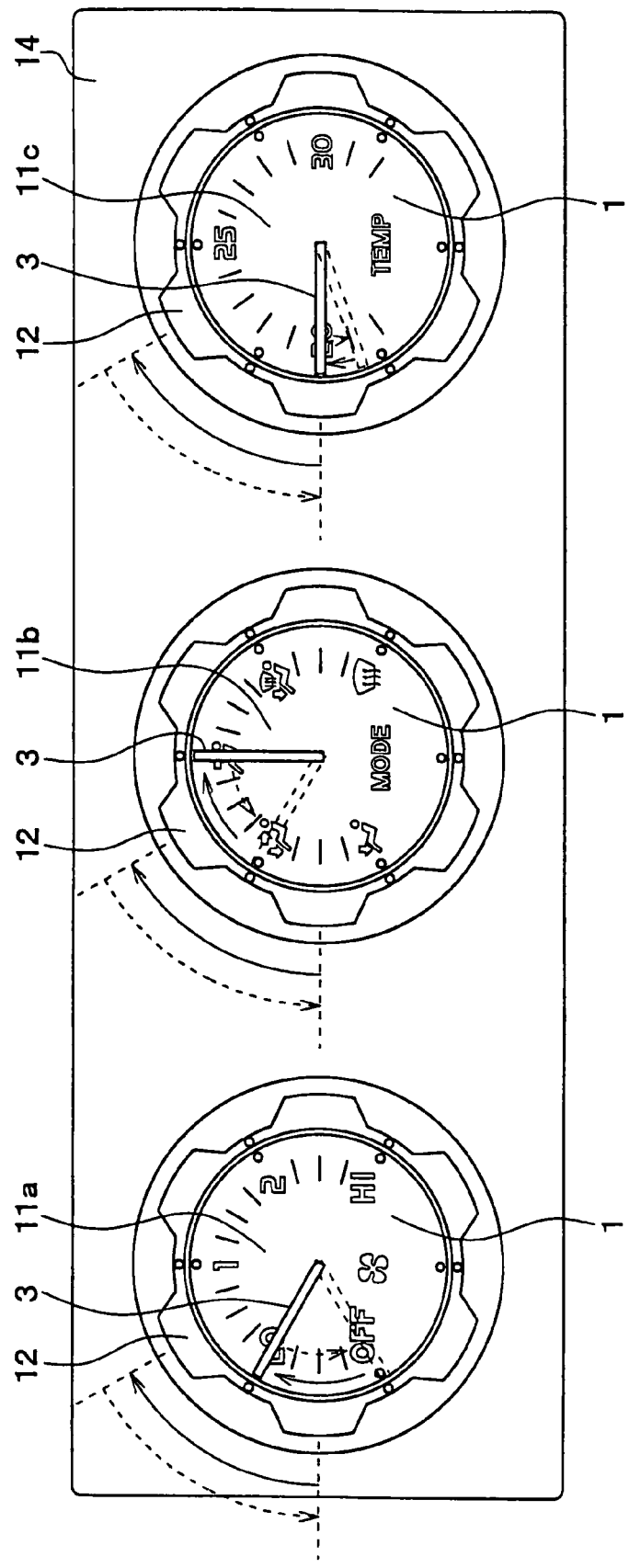
FIG. 2 is a schematic view showing operations of a bezel and a pointer of the pointer type indicating apparatus according to the first embodiment.

FIG. 2 (where operation buttons 13 are not shown) shows the operations of the bezel 12 and the pointer 3. The bezel 12 is rotatable clockwise with respect to the dial plate 1 as indicated by the solid-line arrow in FIG. 2, and rotatable counter-clockwise with respect to the dial plate 1 as indicated by the broken-line arrow in FIG. 2.

In this embodiment, the bezel 12 can be rotated at a predetermined angle (e.g., 60° C.) on a one-by-one basis. That is, the bezel 12 can be rotated till small loops (summing to six) indicated at the periphery of the dial plate 1 coincide with small loops (summing to six) indicated at the bezel 12. The twelve loops in FIG. 2 are provided for the sake of the description and do not really exist on the pointer type indicating apparatus.

When the bezel 12 of the indicator 11a (indicating velocity of blowing fan) or indicator 11b (indicating blowing-out mode) is rotated at every 60° C., for example, the pointer 3 will be rotated at 60° C. or the like. That is, the pointer 3 is rotatable at a predetermined angle on a one-by-one basis responding to the operation (rotation) of the bezel 12.

When the bezel 12 of the indicator 11c (indicating temperature) is rotated by every 60° C., for example, the pointer 3 will be moved to point one of the calibration markings 4. That is, the pointer 3 is rotatable to point each of the calibration markings 4 on a one-by-one basis, responding to the operation (rotation) of the bezel 12.

In this case, the rotation angle of the bezel 12 can be set same with, or different from that of the pointer 3. Moreover, the rotation angle (e.g., 60° C.) of the bezel 12 can be arbitrarily set.

In the case where the vehicle air conditioner is operated by the user through the bezel 12, the setting of the blowing fan velocity which is indicated by the indicator 11a is provided with five scales (items). That is, the pointer 3 can point one of "OFF", "LO", "1", "2" and "HI". On the other hand, in the case where the vehicle air conditioner is automatically controlled, the number of the scales of the setting can be equal to or more than five. That is, the pointer 3 can point any part between "OFF" and "HI" on the dial plate 1.

As shown in FIG. 1, each of the operation buttons 13 is arranged between the adjacent bezels 12. The operation button 13 disposed at the left upper side is provided to set the vehicle air conditioner (A/C). The operation button 13 disposed at the right upper side is provided to set an automatic air-blowing operation. The operation button 13 disposed at the left lower side is provided to operate a defogger of the vehicle. The operation button 13 disposed at the right lower side is provided to set an air circulation mode. The construction of the operation button 13 can be same with the above-described conventional operation buttons B0-B3, and the description thereof is omitted here.

The cover 14 is provided to cover the pointer type indicating apparatus except for the indicators 11, the bezels 12 and the operation buttons 13.

Figure 3:
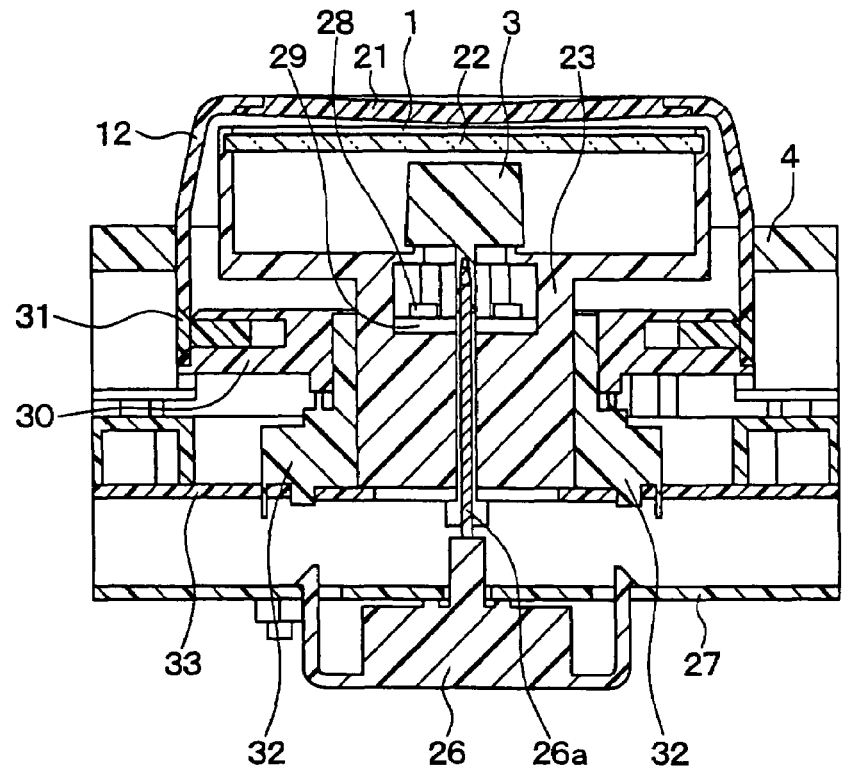
FIG. 3 is a cross-sectional view taken along a line III-III in FIG. 1.
Figure 4:
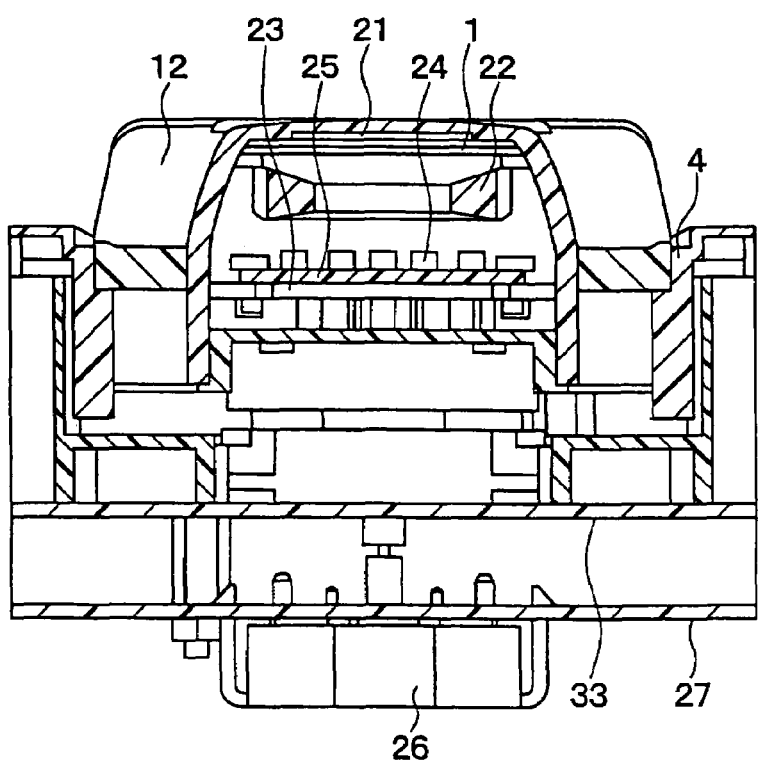
FIG. 4 is a cross-sectional view taken along a line IV-IV in FIG. 1.
Figure 5:
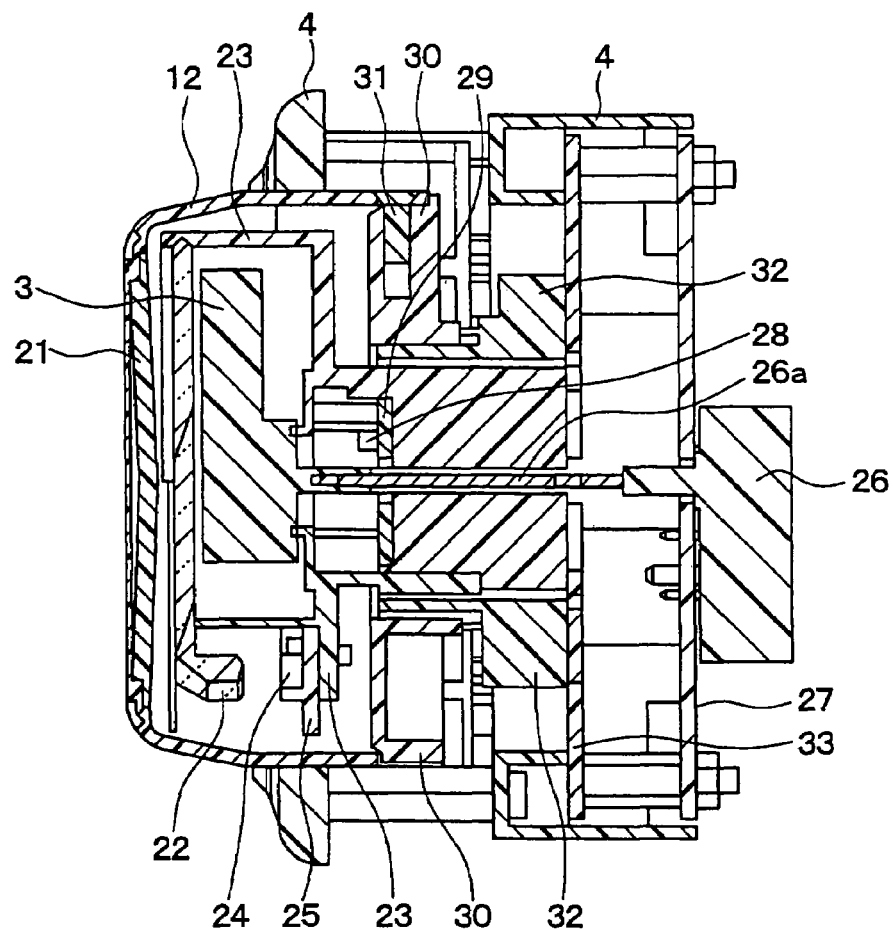
FIG. 5 is a cross-sectional view taken along a line V-V in FIG. 1.

Next, the mechanical construction of the pointer type indicating apparatus will be described. FIGS. 3, 4 and 5 show the cross sections of the pointer type indicating apparatus which are respectively taken along the line III-III, the line IV-IV, and the line V-V in FIG. 1.

As shown in FIGS. 3 and 5, the smoke lens 21, the dial plate 1, a light transmission lens 22 and the pointer 3 are arranged at the inner side of the bezel 12, and sequentially disposed from the face side (i.e., upper side in FIG. 3) to the back side (i.e., lower side in FIG. 3) of the pointer type indicating apparatus.

The dial plate 1 and the light transmission lens 22 are integrally formed by a transparent acrylic resin or the like. The notations 2 (including letters, numbers, illustrations and the like) and the calibration markings 4 are provided on the dial plate 1, and printed as a coloring layer capable of transmitting light. The dial plate 1 is transparent except for the coloring layer of the notations 2 and the calibration markings 4.

Thus, when a dial-plate illumination LED 24 (light source) and a pointer illumination LED 28 (light source) light up, the notations 2, the calibration markings 4 and the pointer 3 (which points notation 2 or calibration marking 4) can be visually identified through the dial plate 1. The dial plate 1 including the light transmission lens 22 has a circular (round) shape, to be arranged inside the bezel 12 having the substantial cylinder shape.

The dial plate 1 is arranged inside the bezel 12 and spaced from the bezel 12. The dial plate 1 is fixed to a dial-plate housing 23. The bezel 12 can be rotated independently of the dial plate 1.

Referring to FIG. 5, the light transmission lens 22 is provided to transmit (introduce) light from the dial-plate illumination LED 24 to the dial plate 1, so that the dial plate 1 is illuminated.

Referring to FIGS. 4 and 5, the dial-plate illumination LED 24 is arranged at a first circuit substrate 25, which is fixed to the dial-plate housing 23. An IC chip (not shown) as an illumination control unit is arranged at the first circuit substrate 25. The dial-plate illumination LED 24 is disposed at the back side with respect to the pointer 3.

The pointer 3 is made of a transparent acrylic resin or the like. The pointer 3 is provided with a coloring layer, which is capable of transmitting light and arranged at least from the tip of the pointer 3 to the connection portion thereof with a stepper motor 26. The pointer 3 except for the part having the coloring layer is provided with a light-tight layer. When the pointer illumination LED 28 lights up, light will transmit the coloring layer of the pointer 3. Thus, the pointer 3 is visually identified.

The pointer 3 is connected with a rotation draft 26a of the stepper motor 26 (driving unit) to be driven. The stepper motor 26 is arranged at a second circuit substrate 27. An IC chip (not shown) as a driving control unit is arranged at the second circuit substrate 27.

The pointer illumination LED 28 for illuminating the pointer 3 is arranged at the back side of the pointer 3, and is fixed to a third circuit substrate 29. The third circuit substrate 29 is attached to the dial-plate housing 23. An IC chip (not shown) as the illumination control unit is arranged at the third circuit substrate 29.

The smoke lens 21, being fixed to the bezel 12, is provided with a low transmittance having a predetermined value. Thus, when the LED 24 of the dial plate 1 and the LED 28 of the pointer 3 light up, the notations 2, the calibration markings 4 and the pointer 3 are visually identified. When the LED 24 and the LED 28 are extinguished, the whole of the dial plate 1 has a black face so that the notations 2, the calibration markings 4 and the pointer 3 cannot be visually identified.

Referring to FIGS. 3 and 5, the bezel 12 is joined to a bezel housing 30 through a connection portion 31. The bezel housing 30 is connected with a rotary switch 32. When the bezel 12 is rotated, the rotary switch 32 will be switched through the bezel housing 30.

The rotary switch 32 is arranged at a fourth circuit substrate 33. An IC chip (not shown) for reading-in the position of the bezel 12 is arranged at the fourth circuit substrate 33.

The rotary switch 32 can be constructed of a switch (e.g., code switch) for outputting an absolute position signal. The case where the code switch is used as the rotary switch 32 is described referring to FIG. 6 which is a disassembled perspective view of the rotary switch 32, and FIG. 7 which is a cross-sectional view taken along the line VII-VII in FIG. 6.

Figure 7:
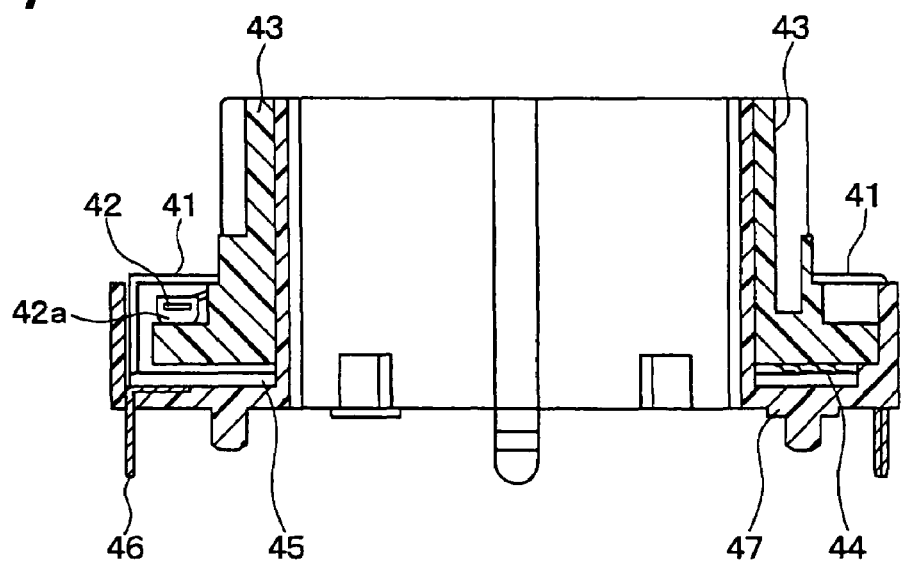
FIG. 7 is a cross-sectional view taken along a line VII-VII in FIG. 6.
Figure 6:
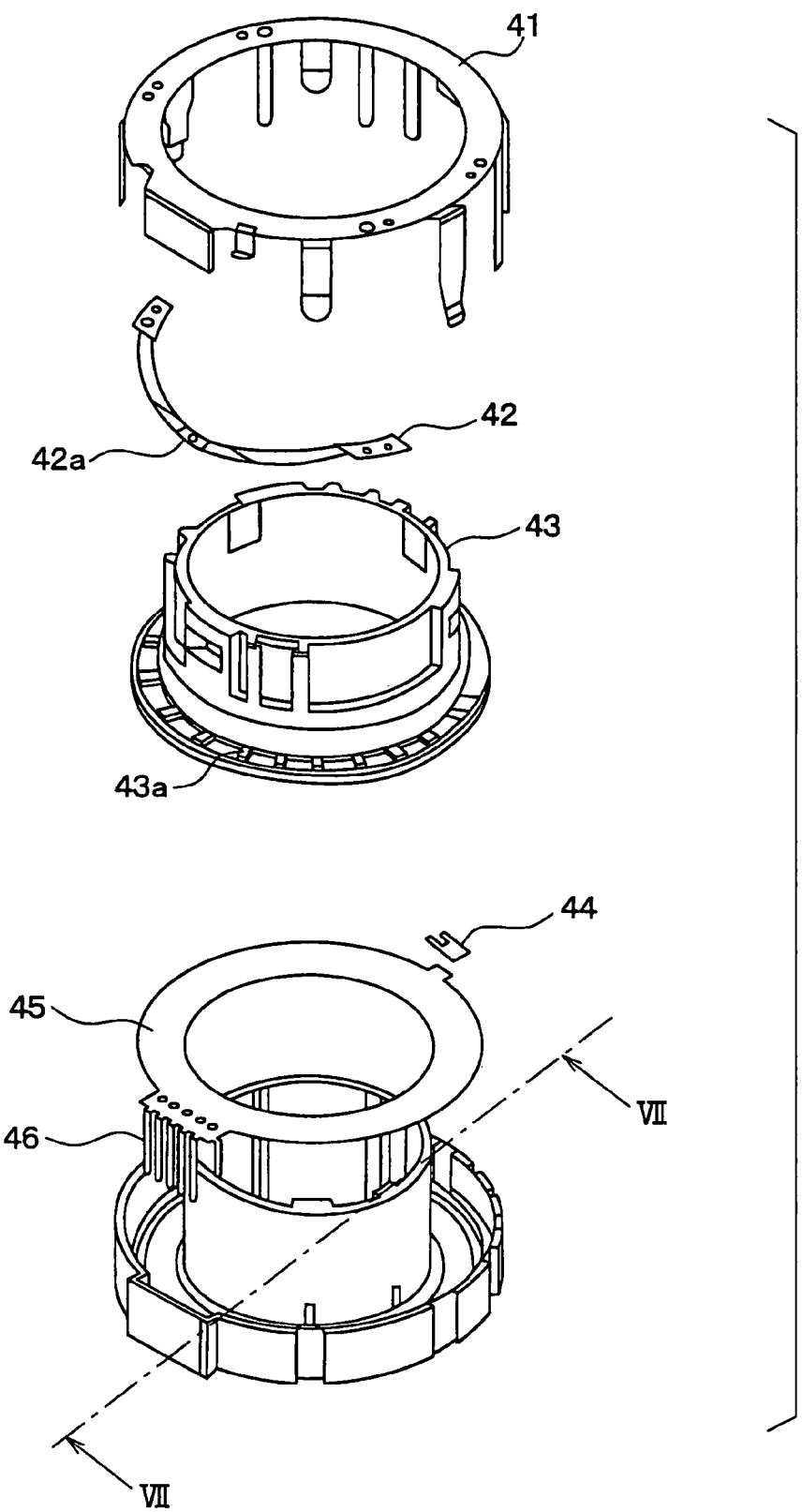
FIG. 6 is a disassembled perspective view showing a rotary switch in FIGS. 3, 4 and 5.

As shown in FIGS. 6 and 7, the rotary switch 32 includes a mounting hardware 41, a click spring 42, a brush mounting plate 43, volume brushes 44, an electrically-conductive unit 45, a terminal 46, a rotary-switch case 47 and the like.

The electrically-conductive unit 45 is constructed of multiple ring-shaped electrically-conductive portions which are concentrically printed. When the bezel 12 is rotated, the brush mounting plate 43 will be rotated so that the volume brushes 44 attached to the brush mounting plate 43 move on the electrically-conductive unit 45. At this time, each of the ring-shaped electrically-conductive portions of the electrically-conductive unit 45 contacts or does not contact the volume brush 44 which corresponds to this electrically-conductive portion. Therefore, the each ring-shaped electrically-conductive portion and the corresponding volume brush 44 function as a switch. Accordingly, the rotation position of the bezel 12 can be detected, based on the statuses of these switches.

Moreover, the rotary switch 32 is provided with a dowel (joggle) portion 42a which is arranged at the click spring 42, and recess portions 43a which are arranged at the brush mounting plate 43 to correspond to the joggle portion 42a. The click spring 42 (joggle portion 42a) and the recess portions 43a construct a moderation unit. When the bezel 12 is rotated at, for example, 60° C. on a one-by-one basis, the joggle portion 42a will be engaged with the recess portion 43a. Thus, the user is provided with a moderation feel when rotating the bezel 12.

Figure 8:
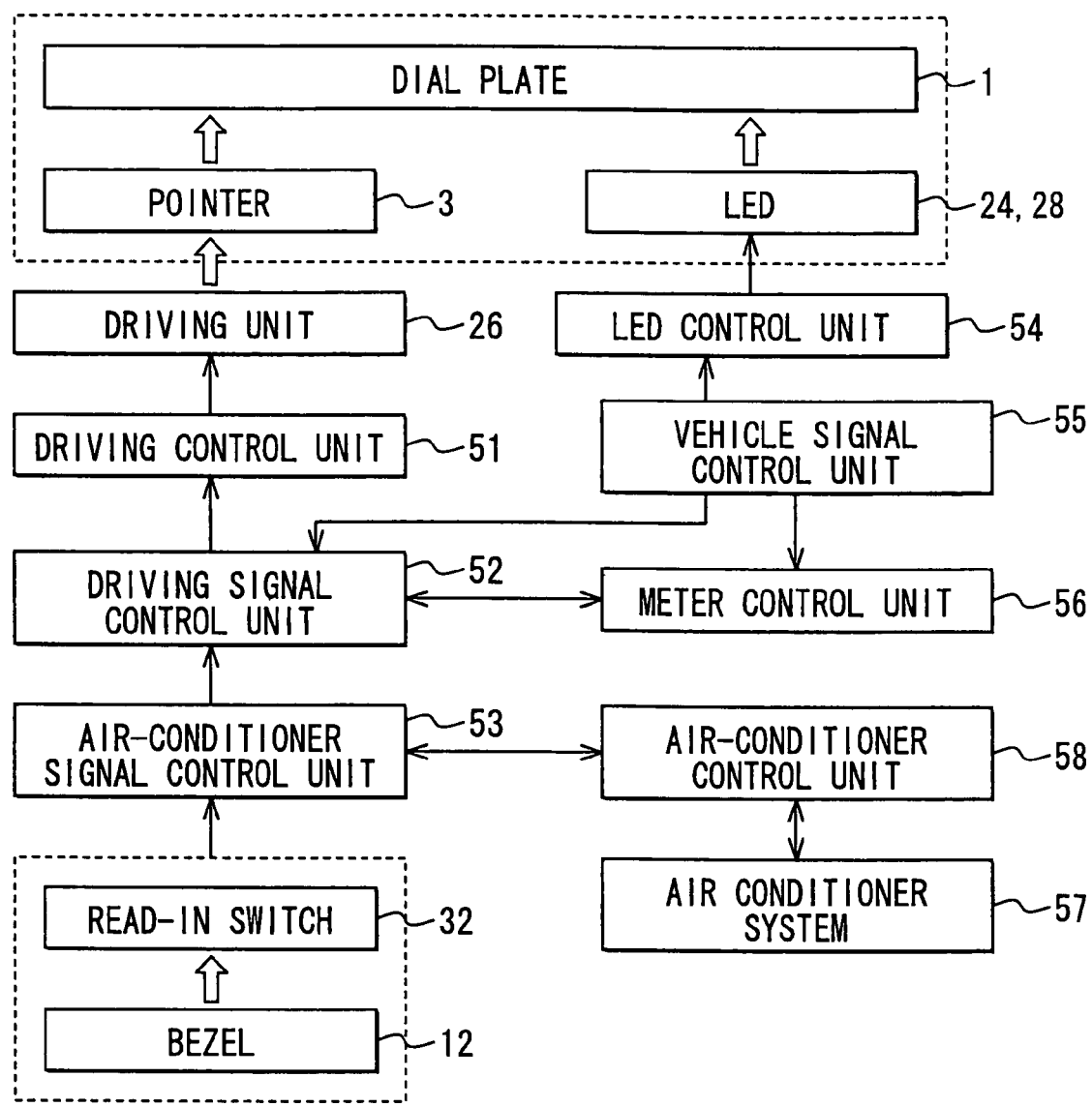
FIG. 8 is a block chart showing a construction of the pointer type indicating apparatus according to the first embodiment.

Next, the electrical construction of the pointer type indicating apparatus will be described with reference to FIG. 8.

According to this embodiment, the pointer type indicating apparatus is provided with the dial plate 1, the pointers 3, the stepper motor 26 (as driving unit), the dial-plate illumination LED 24, the pointer illumination LED 28, the bezels 12 and the rotary switch 32 (as read-in switch).

Moreover, the pointer type indicating apparatus has a driving control unit 51, a driving signal control unit 52, an air-conditioner signal control unit 53 and an illumination control unit 54 (LED control unit). The IC chip arranged at the second circuit substrate 27 constructs the driving control unit 51. The IC chip arranged at the fourth circuit substrate 33 constructs the driving signal control unit 52 and the air-conditioner signal control unit 53. The IC chips arranged at the first circuit substrate 25 and the third circuit substrate 29 construct the illumination control unit 54.

The driving control unit 51 controls the stepper motor 26 based on what is indicated by the pointer 3 pointing the predetermined notation 2 (or calibration marking 4). The driving control unit 51 sends (outputs) a driving instruction signal to the stepper motor 26, according to a driving signal input from the driving signal control unit 52.

The driving signal control unit 52 controls and determines whether or not to actuate the driving control unit 51. The driving signal control unit 52 sends the driving signal to the driving control unit 51, based on signals input from the air-conditioner signal control unit 53 and a vehicle signal control unit 55 which is separately mounted at the vehicle. In this case, the signal from the vehicle signal control unit 55 can be set to indicate, for example, whether or not an IG switch of the vehicle is ON.

The driving signal control unit 52 outputs a signal to a meter control unit 56 for controlling meters such as a speed meter and the like, and receives a signal input from the meter control unit 56. A vehicle velocity signal and the like are input into the meter control unit 56 from the vehicle signal control unit 55.

The signals are communicated between the driving signal control unit 52 and the meter control unit 56, in order to relate the action of the pointer 3 of the air conditioner panel to that of the pointer of the speed meter or the like in the case where the meter is an analog meter. Thus, for example, an interlock between the pointer 3 of the air conditioner panel and the pointer of the speed meter or the like at a beginning and ending (or cease) of the driving becomes capable.

Based on the signal input from the rotary switch 32, the air-conditioner signal control unit 53 outputs an air-conditioner signal to an air-conditioner control unit 58 to perform a predetermined control of the air-conditioner control unit 58, which controls an air conditioner system 57 mounted at the vehicle.

Moreover, based on the signal input from the rotary switch 32, the air conditioner signal control unit 53 outputs a control signal to the driving signal control unit 52 so as to drive the pointer 3.

Furthermore, the control signal from the air-conditioner control unit 58 is also input into the air-conditioner signal control unit 53. Thus, in the case where the air-conditioner control unit 58 automatically controls the air-conditioner system 57, the pointer 3 can be driven responding to the control operation of the air-conditioner control unit 58. The input of the signal from the rotary switch 32 into the air-conditioner signal control unit 53 is set to be prior to that of the control signal from the air conditioner control unit 58.

The illumination control unit 54 is provided to control the activations of the dial-plate illumination LED 24 and the pointer illumination LED 28. Based on the signal input from the vehicle signal control unit 55, the illumination control unit 54 outputs an activation instruction signal to the dial-plate illumination LED 24 and the pointer illumination LED 28. In this case, the signal input from the vehicle signal control unit 55 indicates, for example, the luminosity of an instrument-panel illumination of the vehicle.

Next, the operation of the pointer type indicating apparatus will be described. The case (referring to FIG. 2) where the user switches the speed of the blowing fan from the scale "OFF" to the scale "LO" is described as an example. Other switch operations of the pointer type indicating apparatus by the user are similar to this case.

As indicated by the solid-line arrow in FIG. 2, when the user clockwise (i.e., rightward) rotates the bezel 12 of the indicator 11*a* (indicating information about speed of blowing fan) at 60° C., the rotary switch 32 is switched. Thus, the signal indicating that the speed of the blowing fan is set at the scale "LO" is input into the air-conditioner signal control unit 53 from the rotary switch 32.

Then, the air-conditioner signal control unit 53 outputs the air conditioner signal for an operation at the scale "LO" (of speed of blowing fan) to the air conditioner control unit 58. Thus, the air conditioner system 57 is controlled by the air-conditioner control unit 58, so that the blowing fan operates at the speed corresponding to the scale "LO".

Moreover, in this case, the air-conditioner signal control unit 53 outputs the control signal to the driving signal control unit 52 so that the pointer 3 points "LO".

After the driving signal control unit 52 receives the control signal, the driving signal control unit 52 determines whether or not to activate the driving control unit 51 based on the signal input from the vehicle signal control unit 55. In the case where it is determined that the driving control unit 51 is to be activated, the driving signal control unit 52 outputs the driving signal to the driving control unit 51.

Then, the driving control unit 51 having received the driving signal outputs a driving instruction signal to the stepper motor 26. Thus, the pointer 3 is driven by the stepper motor 26 to point "LO". Therefore, the speed of the blowing fan can be switched from the scale "OFF" to the scale "LO".

Next, the main characteristics of the pointer type indicating apparatus will be described.

According to this embodiment, the indicator 11 is arranged at the inner side of the bezel 12, which has the substantial cylinder shape and is rotatable along the periphery side thereof. The indicator 11 is constructed of the pointer 3 and the dial plate 1, on which the notations 2 and the calibration markings 4 are shown.

That is, in this case, the pointer type indicating apparatus is provided with the indicator 11 and the bezel 12 which are substantially concentrically arranged on the air conditioner panel, without showing the user the operation switches for operating the indicator 11.

Figure 16A:
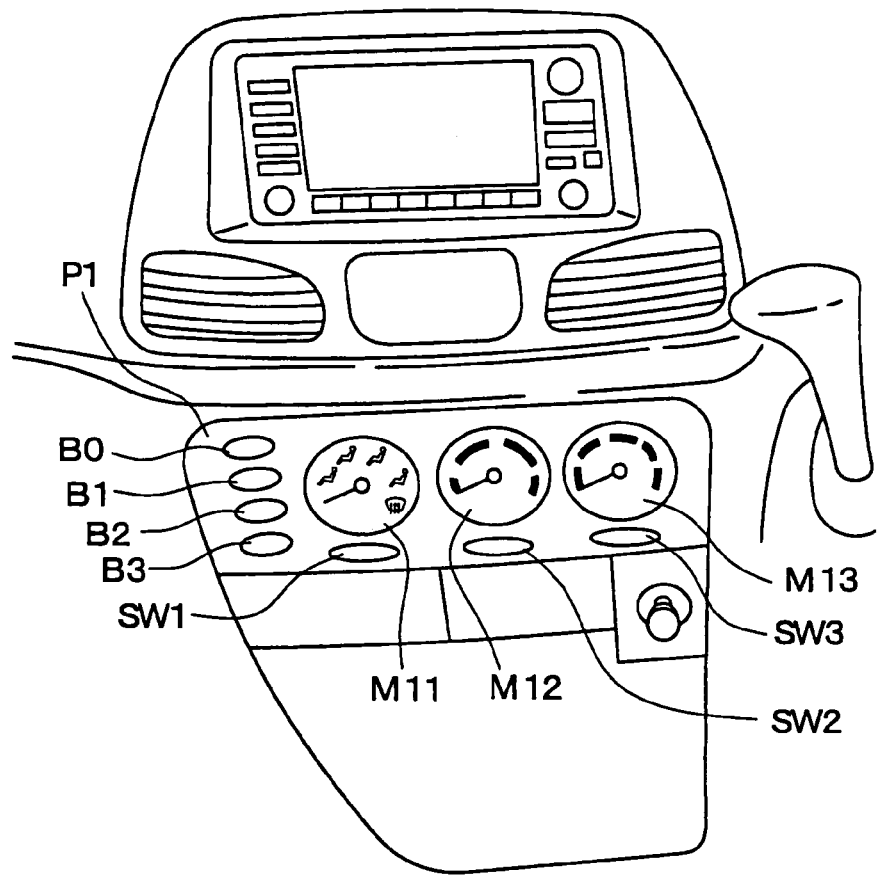
FIG. 16A is a front view showing a pointer type apparatus according to a prior art.
Figure 16B:
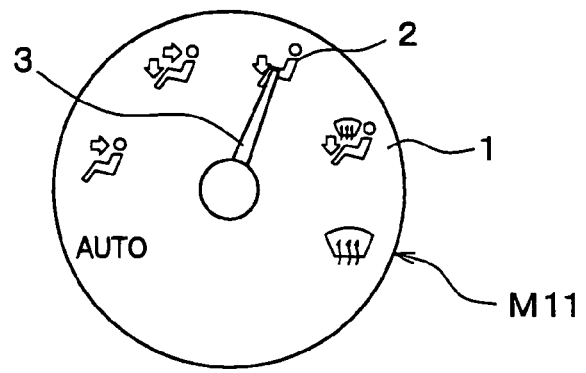
FIG. 16B is an enlarged view of an indicator in FIG. 16A.

Therefore, referring to FIGS. 1 and 16A, the appearance of the pointer type indicating apparatus according to this embodiment can be simplified. Thus, the confusion in operation of the indicator 11 by the user can be restricted, as compared with the comparison example shown in FIGS. 16A and 16B. Accordingly, the operation performance of the pointer type indicating apparatus can be improved.

According to this embodiment, because the indicator 11 and the bezel 12 are substantially concentrically arranged on the air conditioner panel, the appearance design of the pointer type indicating apparatus can be renewed to become fresh. The bezel 12 is exchangeable so that the design of the pointer type indicating apparatus can be diversified.

Moreover, according to this embodiment, the single dial plate 1 and the single pointer 3 are arranged at the inner side of the single bezel 12. The user directly holds the indicator 11 to be capable of operating it through intuition. That is, the user is provided with an intuitionistic operation. Accordingly, the operation performance of the pointer type indicating apparatus can be further improved, as compared with the comparison example.

Furthermore, according to this embodiment, each of the indicator 11 and the bezel 12 has a circular-shaped cross section. The cover 14 of the pointer type indicating apparatus is provided with round openings respectively disposed at the positions corresponding to those of the indicators 11 and the bezels 12. Therefore, a cover of a general air conditioner panel can be used as the cover 14 of the pointer type indicating apparatus of this embodiment. The general air conditioner panel has round-shaped dial switches, and is provided with the cover having round openings at positions corresponding to those of the dial switches.

According to this embodiment, the indicator 11 has a same construction with an analog meter. Therefore, the appearance design of the pointer type indicating apparatus can accord with those of the analog meters such as the speed meter of the vehicle. Thus, the salability of the design of the instrument panel can be increased.

Second Embodiment

In the above-described first embodiment, the code switch is used as the rotary switch 32. According to a second embodiment of the present invention, the rotary switch 32 can be also constructed of a switch other than the code switch, for example, a switch having a variable resistor 63 which has a resistance variable responding to a rotation of the bezel 12, and a switch having a switching unit 65 in addition to the variable resistor 63.

Next, the case where the rotary switch 32 is constructed of the switch having both the variable resistor 63 and the switching unit 65 will be mainly described.

Figure 9:
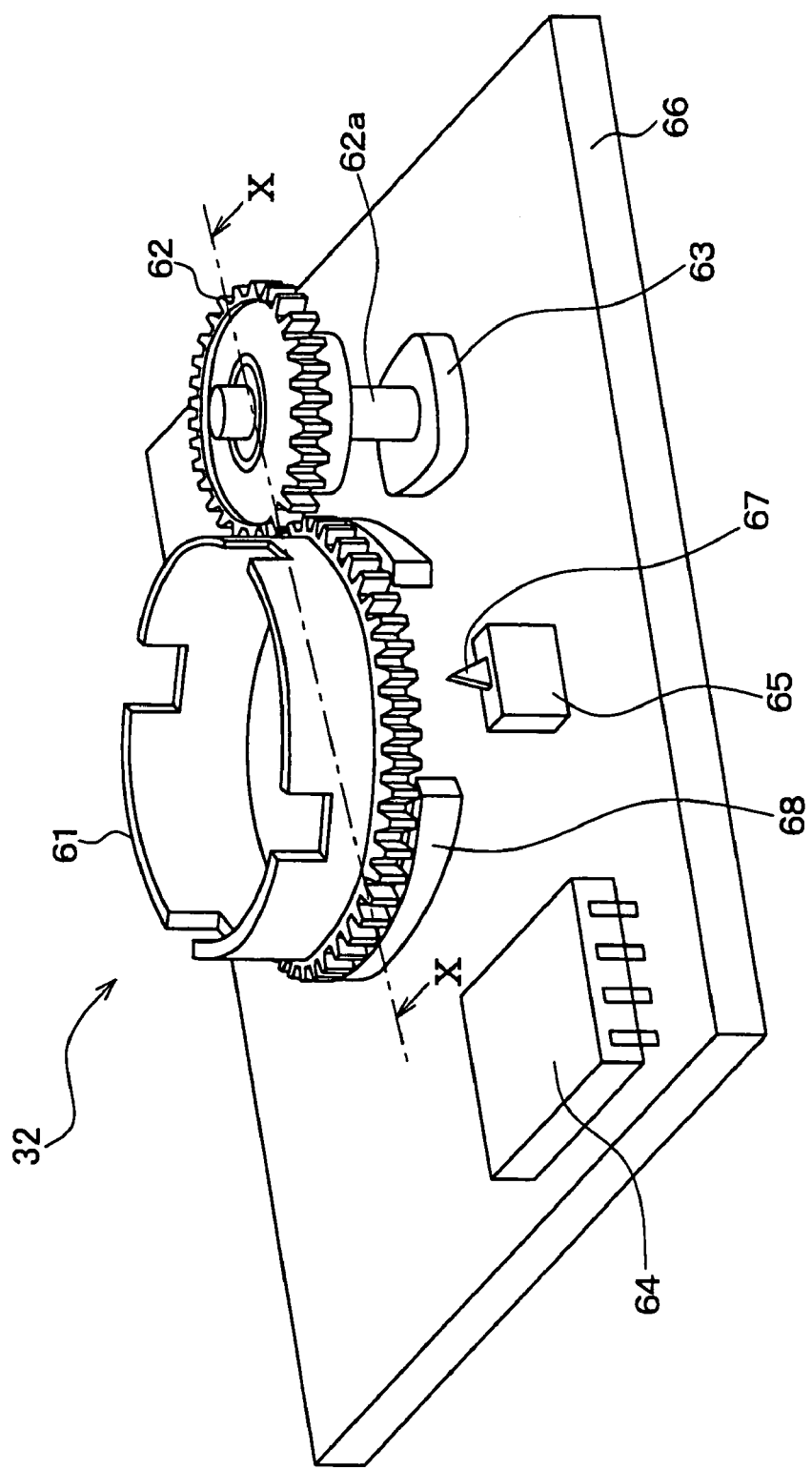
FIG. 9 is a perspective view showing a rotary switch according to a second embodiment of the present invention.
Figure 10:
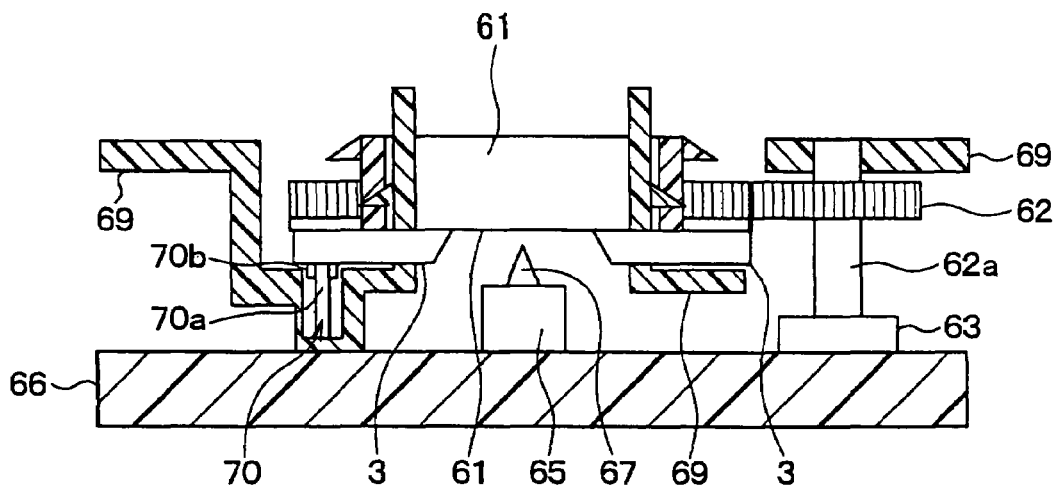
FIG. 10 is a cross-sectional view taken along a line X-X in FIG. 9.

Referring to FIGS. 9 and 10, the rotary switch 32 is provided with a large gear 61 connected with the bezel 12, a small gear 62 which is interlocked with the rotation of the large gear 61, the variable resistor 63 having a terminal portion and a resistance portion 63a which are connected with a rotation draft 62a of the small gear 62, a controller 64, the switching unit 65 and a print substrate 66, on which the large gear 61, the small gear 62, the variable resistor 63, the controller 64 and the switching unit 65 are mounted. The large gear 61 and the small gear 62 are attached to a housing 69.

Figure 11:
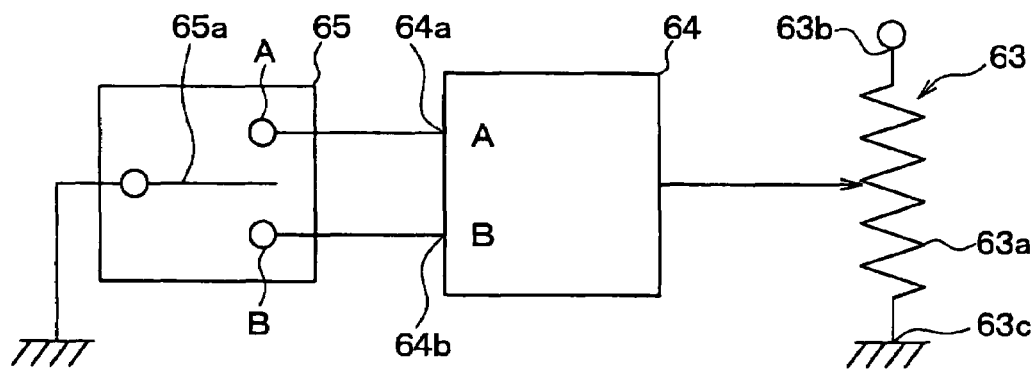
FIG. 11 is a diagram showing an electrical circuit configuration of the rotary switch in FIG. 9.

As shown in FIG. 9, the switching unit 65 is disposed on the print substrate 66, and positioned at a lower side (i.e., print-substrate side) with respect to the periphery of the large hear 61. The switching unit 65 has a lever 67 for switching the switching unit 65 between ON and OFF. As shown in FIG. 11, the switching unit 65 has a contact A, a contact B and a contact terminal 65a, which adjustably contacts the contact A or B responding to a toppling of the lever 67. The controller 64 is provided with input terminals 64a and 64b, which respectively contact the contacts A and B.

The switching unit 65 is provided to detect the toppling direction of the level 67. The switching unit 65 can be constructed of a tactile switch or a pulse switch or the like.

The large gear 61 is provided with a protrusion portion 68 disposed at the bottom side thereof (i.e., print-substrate side). The protrusion portion 68 arranged at the large gear 61 will topple (press) the level 67 responding to the rotation of the large gear 61 so that the contacts A and B of the switching unit 65 are switched between ON and OFF.

The resistance portion 63a of the variable resistor 63 is constructed of an electrically-introductive material such as carbon by printing on a case (not shown). The resistance portion 63a has a substantial single-ring shape, which has a circumferential notch not to be a whole circular shape. A potential difference is provided at two ends 63b and 63c of the resistance portion 63a.

The terminal portion of the variable resistance 63 is movable on the resistance portion 63a while keeping contacting the resistance portion 63a. In this case, the terminal portion has a multiple-circuit movement on the resistance portion 63a.

As shown in FIG. 11, the potential difference between the terminal portion and the end 63c having the grounded potential of the resistance portion 63a is input into the controller 64. The controller 64 determines the rotation position of bezel 12, based on both a voltage value of the terminal portion of the variable resistor 63 and states (ON or OFF) of the contacts A and B of the switching unit 65.

Figure 12:
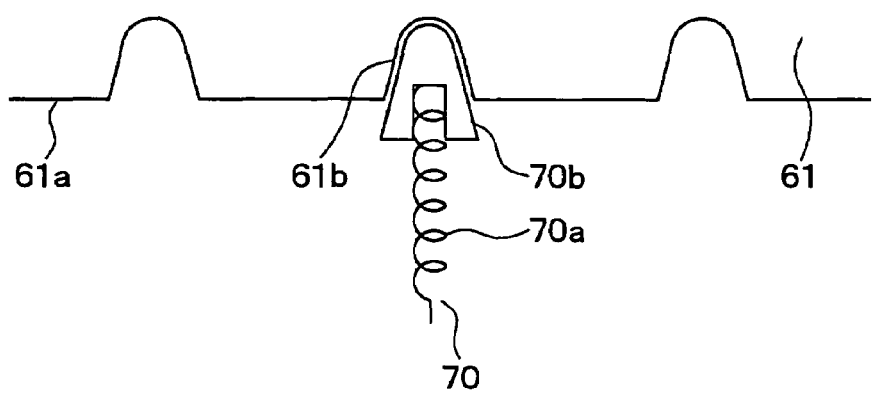
FIG. 12 is a schematic view showing a moderation unit of the rotary switch in FIG. 9.

Moreover, the rotary switch 32 is provided with a click spring 70 and a recess 61b, which construct a moderation unit. Referring to FIG. 12, the click spring 70 has a spring portion 70a and a hemispherical portion 70b disposed at the tip of the spring portion 70a.

Referring to FIG. 10, the click spring 70 is arranged at the housing 69. The hemispherical portion 70b contacts a bottom surface 61a of the large gear 61. On the other hand, the recess 61b is arranged at the bottom surface 61a, and sized to be capable of containing the hemispherical portion 70b of the click spring 70.

When the bezel 12 is rotated at every, for example, 60° C., the relative position of the recess portion 61b to the large gear 61 is adjusted so that the recess portion 61b accommodates the hemispherical portion 70b therein.

Thus, responding to the rotation of the bezel 12, the hemispherical portion 70b positioned in the recess portion 61b of the large gear 61 leaves the recess portion 61b so that the spring portion 70a is compressed, or enters the recess portion 61b so that the spring portion 70a is returned to have the original length. Thus, the user can be provided with the moderation feel (click feel) when rotating the bezel 12.

The rotary switch 32 described in the first embodiment is constructed of the code switch, which is provided with the multiple overlapped ring-shaped units (e.g., electrically-conductive unit 45 and brush mounting plate 43) to have a large size. Generally, because the terminal 46 rubs against the ring-shaped electrically-conductive unit 45, the electrically-conductive unit 45 is provided with a gold plating.

According to the second embodiment, the rotary switch 32 is provided with the resistance portion 63a having the single-ring shape, thus being small-sized compared with that constructed of the code switch. The resistance portion 63a of the variable resistor 63 can be made of a cheaper material (e.g., copper) compared with the gold plating.

Therefore, according to the second embodiment, the component cost of the rotary switch 32 can be reduced.

Alternatively, the rotary switch 32 can be provided with the variable resistance 63, without the switching unit 65. That is, the switching unit 65 shown in FIGS. 9 and 10 can be omitted. In this case, the rotary switch 32 detects the rotation position of the bezel 12, only based on the voltage value of the terminal portion of the variable resistor 63.

Other Embodiments

Although the present invention has been fully described in connection with the preferred embodiments thereof with reference to the accompanying drawings, it is to be noted that various changes and modifications will become apparent to those skilled in the art.

In the first embodiment, the case where the dial plate 1 is arranged at the front side (i.e., further face side of pointer type indicating apparatus) with respect to the pointer 3 is described as an example. That is, the pointer 3 is arranged at the back side of the dial plate 1. However, the pointer 3 can be also arranged at the front side of the dial plate 1. That is, similar to the general vehicle meters, the pointer 3 is arranged at the further face side of the pointer type indicating apparatus with respect to the dial plate 1.

In this case, the dial plate 1 and the light transmission lens 22 are separately constructed. Light from the light transmission lens 22 passes through the dial plate 1, so that the notations 2 (letters, numbers, illustrations or the like) and the calibration markings 4 of the dial plate 1 are illuminated.

Moreover, in the first embodiment, the dial plate 1 arranged in the bezel 12 has a round shape. In the case where the bezel 12 is disposed at the further face side (front side) of the pointer type indicating apparatus with respect to the dial plate 1, the dial plate 1 can be provided with a larger size than the inner contour (i.e., outer contour of smoke lens 21) of the face surface of the cylinder-shaped bezel 12 to have a shape other than the round. In this case, the part of the dial plate 1 positioned at the inner side of the smoke lens 21 can be visually identified by the user, and the other part thereof is covered by the bezel 12 and the cover 14. That is, the user is shown the round-shaped dial plate 1 which is disposed within the inner contour of the bezel 12.

Furthermore, in the first embodiment, the indicators 11a, 11b and 11c, which are separated from each other, are respectively provided with the dial plates 1 which are separated from each other. However, in the case where the bezel 12 is arranged at the further face side of the pointer type indicating apparatus with respect to the dial plate 1, the indicators 11a, 11b and 11c can also share the single dial plate 1, on which the various index portions (notations 2 and/or calibration markings 4) for the indicators 11a, 11b and 11c are shown. In this case, each of the bezels 12 has therein the one pointer 3, and the part of the dial plate 1 where the one kind of the index portion is arranged.

Moreover, in the first embodiment, each of the indicator 11a about the blowing fan speed, the indicator 11b about the blowing-out mode and the indictor 11c about the temperature is constructed of the analog meter. However, the construction where at least one of the indicators 11a, 11b and 11c is the analog meter can be also provided for the pointer type indicating apparatus of the present invention.

Moreover, the notations 2 and the calibration markings 4 shown on the dial plate 1 can be also arranged along a line or other shapes.

In the first embodiment, the driving signal control unit 52 and the air-conditioner signal control unit 53 are respectively provided. However, the driving signal control unit 52 and the air-conditioner signal control unit 53 can be also constructed of a single control unit. That is, the single control unit functions as both the driving signal control unit 52 and the air-conditioner signal control unit 53.

Moreover, the driving control unit 51, the driving signal control unit 52 and the air-conditioner signal control unit 53 can be also arranged at a single circuit substrate, as compared with the first embodiment where they are respectively arranged at the different circuit substrates.

Moreover, in the first embodiment, the one indicator 11 is disposed at the inner side of the one bezel 12. However, the multiple indicators 11 can be also arranged at the inner side of the one bezel.

Figure 13:
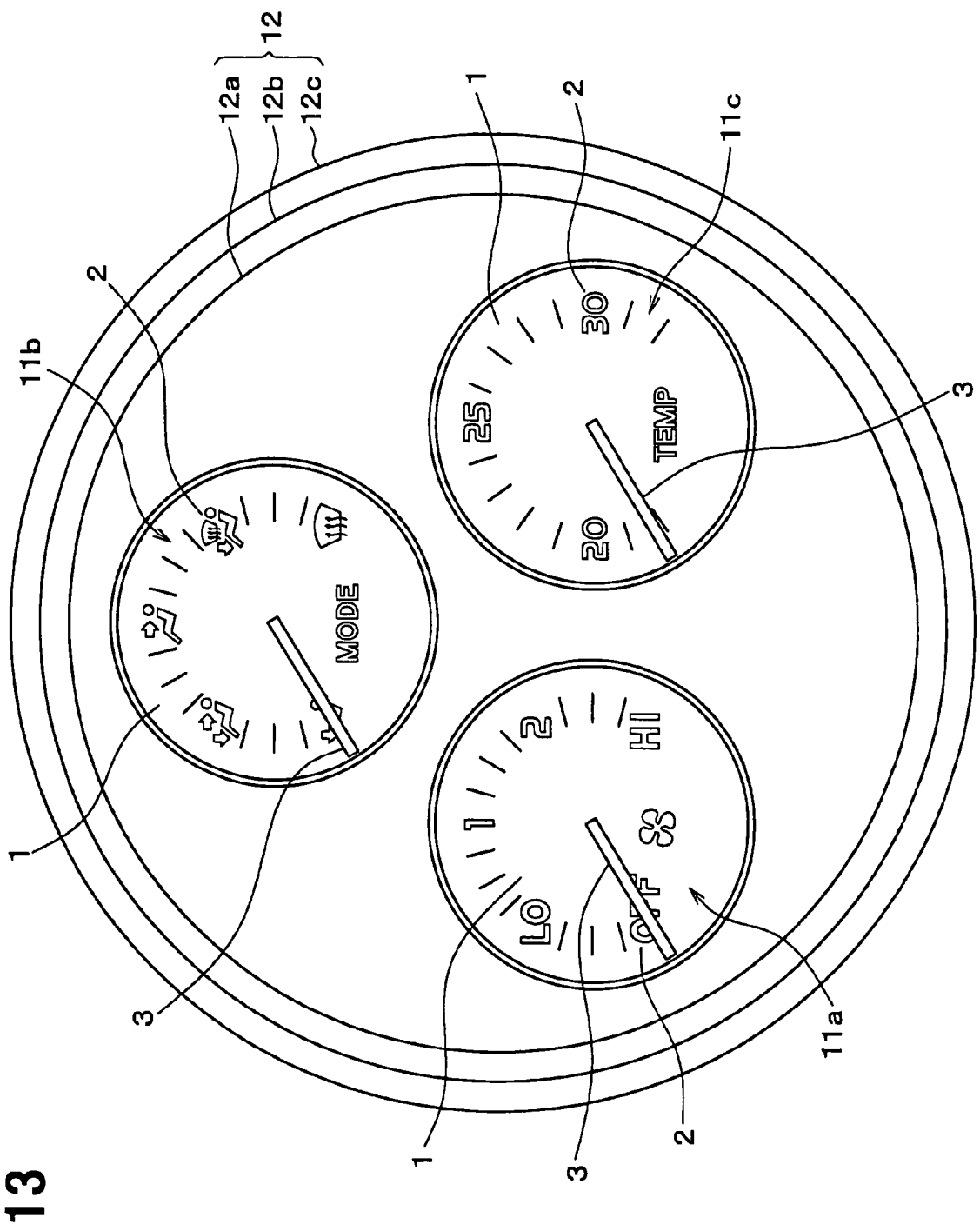
FIG. 13 is a front view showing a pointer type indicating apparatus according to a first modification of the first embodiment.

FIG. 13 shows a first modification of the pointer type indicating apparatus of the first embodiment. In this case, the bezels 12 (i.e., bezels 12a, 12b and 12c for respectively driving pointers 3 of indicators 11a, 11b and 11c) are concentrically arranged. The three indictors 11a, 11b and 11c are arranged inside the bezel 12a, which is disposed at the most inner side among the three bezels 12a, 12b and 12c. The indictors 11a, 11b and 11c are respectively provided with the round-shaped dial plates 1.

In this case, the layout of the three indicators 11a, 11b and 11c and the three bezels 12a, 12b and 12c is different from that of the pointer type indicating apparatus shown in FIG. 1. Other constructions of the pointer type indicating apparatus according to the first modification are the same with those of the pointer type indicating apparatus shown in FIG. 1.

According to the first modification, the appearance of the pointer type indicating apparatus can be further simplified.

Figure 14:
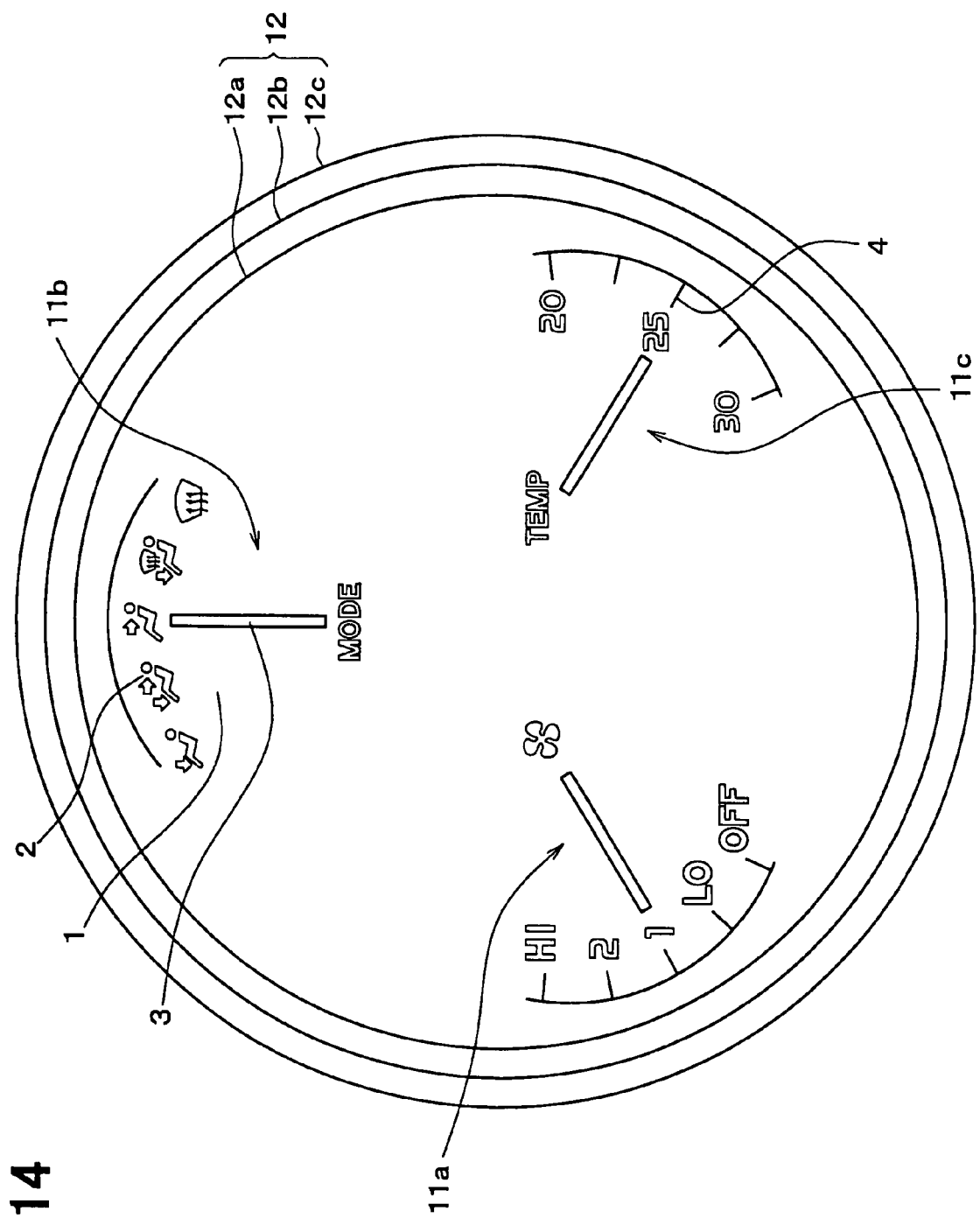
FIG. 14 is a front view showing a pointer type indicating apparatus according to a second modification of the first embodiment.

FIG. 14 shows a second modification of the pointer type indicating apparatus of the first embodiment. According to the second modification, the multiple indicators 11 are arranged at the inner side of the one bezel 12a. For example, as shown in FIG. 14, the three indicators 11a, 11b and 11c are respectively fan-shaped. That is, each of the dial plates 1 is fan-shaped, or the three kinds of index portions (notations 2 and/or calibration markings 4) are arranged along an arc on the one dial plate 1. In this case, the pointers 3 of the indicators 11a, 11b and 11c can be respectively driven by the bezels 12a, 12b and 12c.

In the second modification, the layout of the three indicators 11a, 11b and 11c and the three bezels 12a, 12b and 12c is different from that of the pointer type indicating apparatus shown in FIG. 1. Other constructions of the pointer type indicating apparatus according to the second modification are the same with those of the pointer type indicating apparatus shown in FIG. 1.

Moreover, the numbers of the bezels 12 and the indicators 11 in the pointer type indicating apparatus of the present invention can be arbitrarily changed.

Furthermore, the pointer type indicating apparatus can be also suitably used for operation panels of other devices such as an audio, a camera 15 (FIG. 15B) and the like.

Figure 15A:
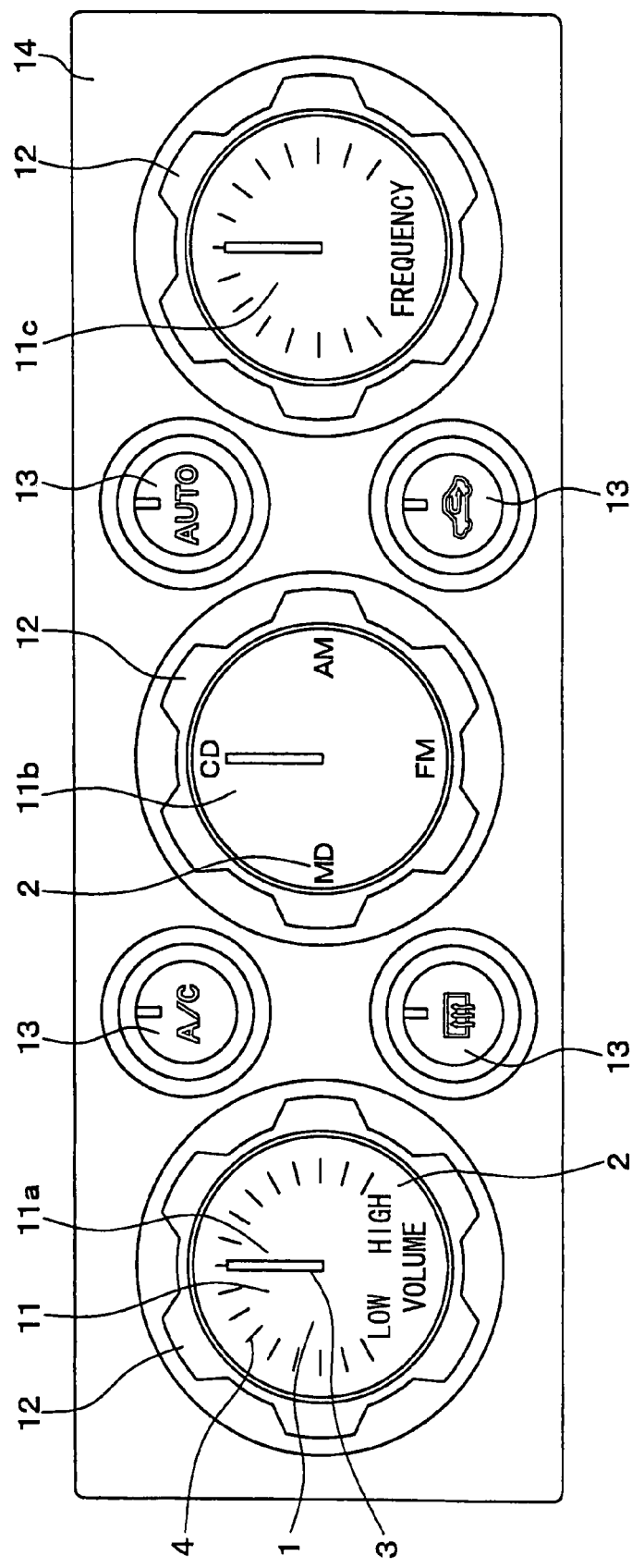
FIG. 15A is a front view showing a pointer type indicating apparatus according to a third modification of the first embodiment.
Figure 15B:
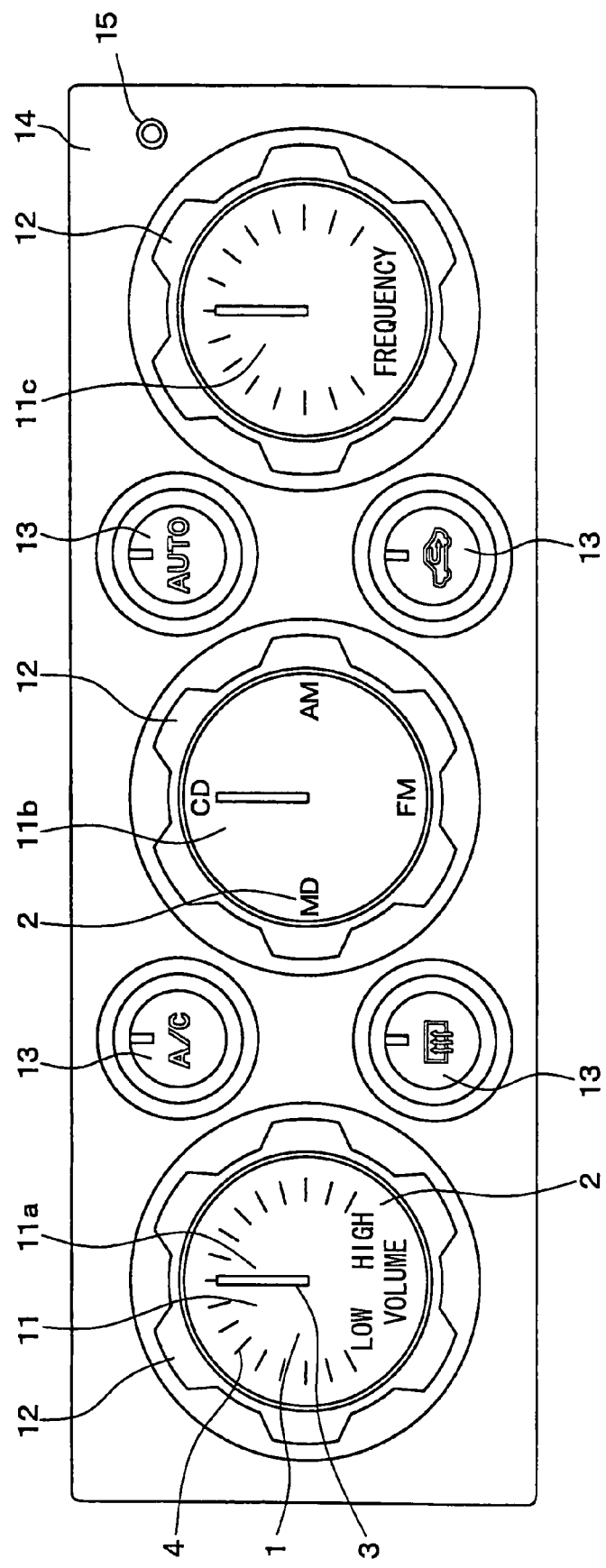
FIG. 15B is a front view showing a pointer type indicating apparatus according to a fourth modification of the first embodiment.

FIG. 15A shows a third modification of the pointer type indicating apparatus of the first embodiment. In this case, the pointer type indicating apparatus is suitably used for the operation panel of the audio. In this case, the indicator 11a is provided to indicate the volume of the audio. The indicator 11b is provided to indicate the sort of the audio device, for example, "CD", "MD", "AM", and "FM". The indicator 11c is provided to indicate the frequency of the audio. FIG. 15B is the same as FIG. 15A but camera 15 has been added.

Such changes and modifications are to be understood as being in the scope of the present invention as defined by the appended claims.

What is claimed is:

1. A pointer type indicating apparatus comprising:
   at least one dial plate which has at least one index portion having a plurality of operation information items;
   at least one pointer which is driven to point to a preferable one of the operation information items indicated by the index portion;
   at least one driving unit for driving the pointer; and
   at least one operation unit, which is adjustable by a user to actuate the driving unit so that the pointer points to the preferable one of the operation information items, wherein:
   the operation unit has a substantial cylinder shape defining an internal cavity and is rotatable; and the dial plate, the index portion having the plurality of operation information items and the pointer are disposed within the internal cavity of the operation unit.

2. The pointer type indicating apparatus according to claim 1, wherein
a single pointer and a single dial plate having a single index portion are disposed within a single internal cavity of a single operation unit.

3. The pointer type indicating apparatus according to claim 1, wherein
the operation unit is constructed such that the pointer is capable of pointing to the preferable one of the operation information items in response to rotation of the operation unit in one of a clockwise direction and a counter-clockwise direction with respect to the dial plate.

4. The pointer type indicating apparatus according to claim 1, wherein the operation unit has a moderation unit in a rotation direction thereof.

5. The pointer type indicating apparatus according to claim 4, further comprising
a rotary switch which is connected with the operation unit to detect a rotation position of the operation unit, the moderation unit being mounted at the rotary switch.

6. The pointer type indicating apparatus according to claim 5, wherein the rotary switch is constructed of a code switch.

7. The pointer type indicating apparatus according to claim 5, wherein the rotary switch has a variable resistor.

8. The pointer type indicating apparatus according to claim 7, wherein the rotary switch further has a switching unit.

9. The pointer type indicating apparatus according to claim 1, wherein the operation information items of the index portion are related to an air conditioner of a vehicle.

10. The pointer type indicating apparatus according to claim 9, wherein the at least one index portion includes information related to at least one of a blowing fan speed, a temperature and a blowing-out mode of the air conditioner.

11. The pointer type indicating apparatus according to claim 10, wherein
three dial plates, three pointers, three driving units and three operation units are provided to construct three sets, which are independent of each other and respectively indicate the information of the blowing fan speed, the information of the temperature and the information of the blowing-out mode,
each of the set including a single dial plate, a single pointer, a single driving unit and a single operation unit.

12. The pointer type indicating apparatus according to claim 10, wherein:
the information of the blowing fan speed is indicated by at least letters including "OFF", "LO" and "HI".
the information of the temperature is indicated by at least numbers related to the temperature; and
the information of the blowing-out mode is indicated by at least illustrations for a foot blowing-out mode, a bi-level blowing-out mode, a head blowing-out mode, a foot/defogger blowing-out mode and a defogger blowing-out mode.

13. The pointer type indicating apparatus according to claim 1, further comprising
at least one light source for illuminating the index portion and the pointer.

14. The pointer type indicating apparatus according to claim 1, wherein the operation unit having the substantial cylinder shape is rotatable with respect to a central axis thereof.

15. The pointer type indicating apparatus according to claim 14, wherein:
the operation unit is rotatable at a predetermined angle on a one-by-one basis, the rotation of the operation unit being independent of the dial plate; and
the pointer is rotatable with respect to the operation unit at a predetermined angle on a one-by-one basis responding to the rotation of the operation unit.

16. The pointer type indicating apparatus according to claim 1, wherein the operation unit is a bezel dial knob.

17. The pointer type indicating apparatus according to claim 16, wherein the bezel dial knob has a smoke lens, which is transparent and fixed at the inner side thereof.

18. The pointer type indicating apparatus according to claim 1, wherein the driving unit is a stepper motor.

19. The pointer type indicating apparatus according to claim 1, wherein:
a plurality of operation units are arranged; and
a plurality of dial plates and a plurality of pointers are disposed within the internal cavity of the most inner one of the operation units.

20. The pointer type indicating apparatus according to claim 1, wherein the operation information items indicated by the index portion are related to one of an audio and a camera.

* * * * *